Patented Jan. 3, 1950

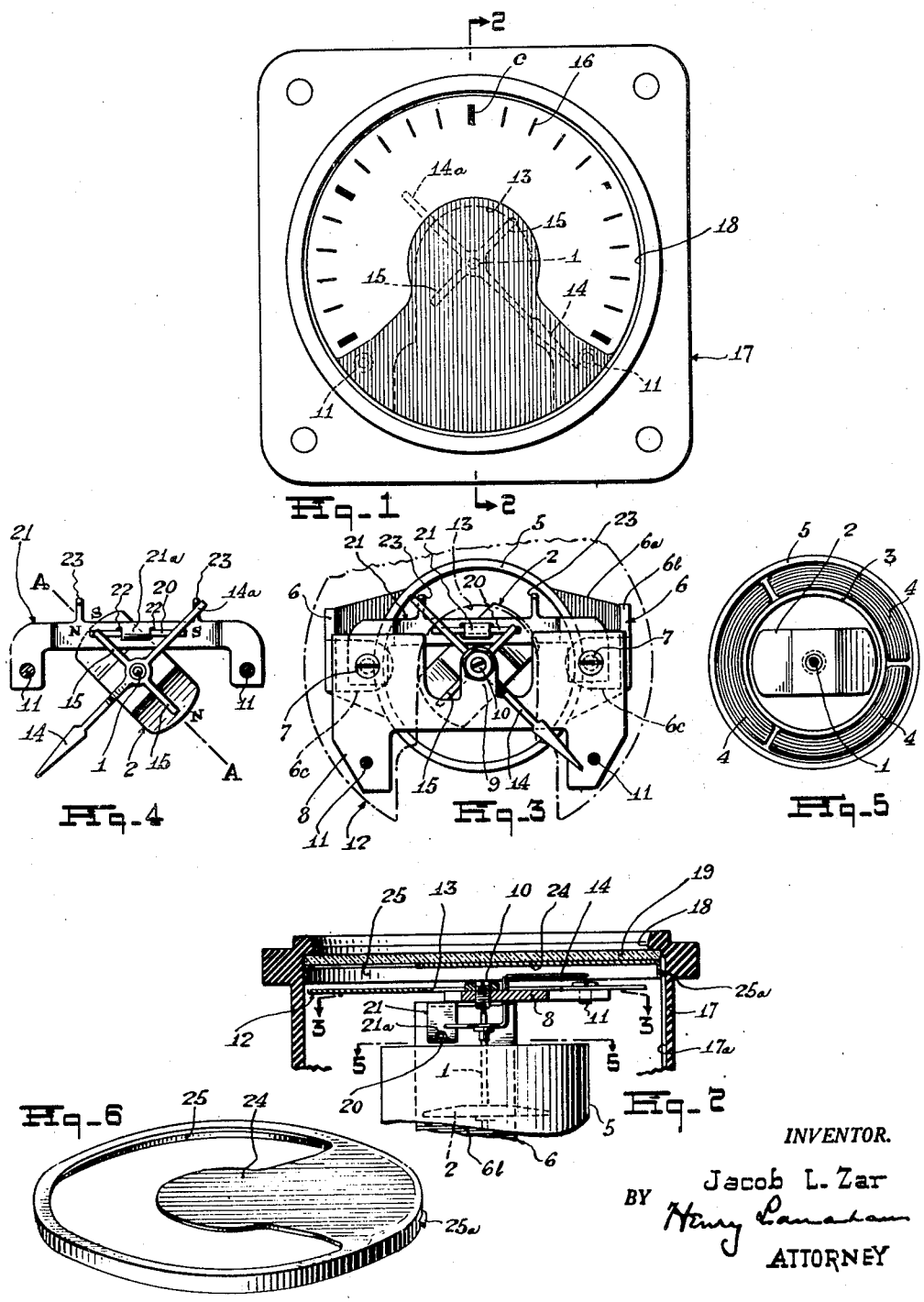

2,493,376

UNITED STATES PATENT OFFICE 2,493,376

MAGNETICALLY BIASED INDICATING INSTRUMENT

Jacob L. Zar, Orange, N. J., assignor to Thomas A. Edison, Incorporated, West Orange, N. J., a corporation of New Jersey Application February 10, 1945, Serial No. 577,285

2 Claims. (Cl. 171—95)

This invention relates particularly to instruments of the type which is actuated by two opposing torques not present when the excitation on the instrument is removed, and is concerned especially with a novel arrangement for concealing the indicating pointers of such instruments when they are out of operation.

In instruments of the type mentioned, the rotor is under the influence of two opposing torques which are produced electrically from a common source of potential but differentiated in value according to the quantity being measured, each indicating position being one wherein these actuating torques are in balance. When the meter is put out of operation by being disconnected from the potential source, the actuating torques on the rotor are no longer present. To prevent the indicating pointer from then drifting across the dial or scale, the rotor is subjected to a biasing torque—hereinafter referred to as a "drift" torque—which is small relative to the actuating torques but which will hold the pointer at a zero or non-indicating position while the meter is out of operation. It is an object of my invention to conceal the pointer from view while the meter is not in use.

In instruments employing permanent magnet rotors the drift torque is commonly supplied by a permanent magnet—hereinafter referred to as a "drift" magnet—which is mounted near the rotor so that it will exert a biasing torque thereon. This method of providing a drift torque is very simple, but has not been satisfactory for instruments having a scale length greater than 180°, such as telemeter receivers, because a drift magnet operating in conjunction with a permanent magnet rotor will produce drift torque in one direction through only a 180° range, as the direction of the drift torque is reversed beyond this range. By my invention, however, I set the drift magnet so that the crossover point at which the drift torque changes direction is at an intermediate point on the dial or scale, and have then the pointer move beyond one or the other extremity of the scale when the meter is put out of operation. With this biasing arrangement I provide a mask which is effective to conceal the pointer in the positions thereof beyond the extremities of the scale. Thus, whenever the meter is out of operation the pointer is held in a concealed position. This is as satisfactory from an operational standpoint as is the conventional system of biasing the pointer into an exposed position at the zero end of the scale for when the pointer is not in view the operator will know the meter is not in operation. Moreover, when the pointer is out of view it is of no importance whether it is resting beyond one scale extremity or the other, for when the meter is put back in operation the pointer will assume a true indicating position irrespective of its initial resting position.

It is accordingly a further object of my invention to provide a novel and effective combination of elements for concealing the indicating pointer of an instrument of the type described when the instrument is put out of operation.

It is another object to provide an improved drift torque system for indicating meters having an operating range greater than 180° but less than a complete revolution.

It is a further object to fulfill the aforestated objectives in instruments where drift torque is produced by permanent magnetic means.

A further object is to provide an improved indicating instrument wherein one or more of the aforestated objects are fulfilled.

These and other objects of my invention will be more fully apparent from the following description and the appended claims.

In the description of my invention reference is had to the accompanying drawings, of which:

Figure 1 is a view, as seen looking toward the dial, of an indicating instrument embodying my invention;

Figure 2 is a fractional sectional view taken on the line 2—2 of Figure 1;

Figure 3 is a view taken on the line 3—3 of Figure 2 but showing the dial fractionally in dash-dot lines, the pointer being here shown in its terminal position beyond the higher extremity of the scale;

Figure 4 is a fractional view similar to Figure 3 but showing the pointer in its terminal position beyond the lower extremity of the scale;

Figure 5 is a fractional view as seen from the line 5—5 of Figure 2; and

Figure 6 is a detailed view of a component of the invention.

Purely by way of example, I herein show my invention applied to a telemetric receiver of the character described and claimed in the application Serial No. 465,221, of Frederick G. Kelly, having a common assignee with the present application and now issued as Patent No. 2,372,002. In this instance the telemeter receiver has a 360° length of scale. However, this same instrument may be used in applications where lesser scale lengths are required. By way of a preferred example, the scale length is here considered to be greater than 180° but less than a complete resolution, a preferred value being of the order of 240° as shown. Also, it will be understood that the present invention is not limited to meters having graduated scales as it is only important that the operating angular range of the rotor shall fall within the angular limits above mentioned.

The telemetric receiver here shown comprises a rotor having a pivoted shaft 1 carrying a permanent bar magnet 2, the magnet 2 being supported within a suitable damping cup 3. Surrounding the cup 3 are three similar field coils 4 each of which may be arcuate so as to conform to the damping cup as shown in Figure 5. Surrounding the field coils is a cylindrical shield 5 of a non-permanent magnetic material which is positioned so that its axis is centered with the shaft 1. The field coils are connected in an energizing circuit so that the coils will cooperate to produce a resultant magnetic field which will rotate about the central axis of the meter upon variation of a condition to be measured. Such circuits are well known and need not be herein shown, a specific example being described for example in the above mentioned Kelly patent.

The shield 5 may be secured to the base 6a of a bracket 6 having upstanding legs 6b with turned-in lugs 6c at the top. Mounted on these lugs and held thereto by screws 7 is a bridge 8. This bridge has its central portion recessed and provided with an ear 9 that extends towards the center of the scale as will hereinafter more fully appear. This ear carries a jewel screw 10 serving as a top bearing for the shaft 1. Also carried by this bridge 8, and held thereto by screws 11, is a circular dial 12 having an opening 13 at its central portion which runs out through the periphery of the dial at the side of the jewel screw opposite the center of the scale. Secured to the top part of the shaft 1 is a pointer 14 and a pair of cross arms 15. This pointer is offset so as to extend upwardly through the recesses of the bridge 8 and the opening 13 of the dial, and is then bent over so as to overlie the dial. On this dial there is a scale 16 by which the angular positions of the pointer are indicated, this scale being approximately 240° in length. The meter is enclosed in a case 17 having a circular shouldered opening 18 at the top to expose the dial 12, there being a bezel 19 mounted in this opening as hereinafter explained.

By way of illustration the magnet 2 of the rotor may have its magnetic axis A—A (see Figure 4) extending transversely to the pointer. When the meter is in operation the field coils are energized and produce a resultant magnetic field, and the rotor assumes a position wherein its magnetic axis is in line with that field. When the meter is out of operation the coils no longer have any magnetic field influence on the rotor. To prevent the rotor from then floating and the pointer from drifting across the scale, there is provided a drift magnet 20. This is a long relatively slender magnet supported at the top of the instrument, just above the shield 5 and near the shaft 1, on a cross member 21 held at the ends by the screws 7. This cross member has a central raised portion 21a with apertures 22 at the ends. The magnet extends through these apertures and is held in place by clamping pressure exerted thereagainst by the raised portion 21a. This drift magnet extends crosswise to a medial plane of the instrument through the center C of the scale—a plane corresponding to the section line 2—2 of Figure 1—and is so polarized that it tends to move the rotor to a position wherein the pointer is directly opposite the center of the scale. For instance, the relative polarities of the rotor magnet 2 and the drift magnet 20 are as indicated in Figure 4, N being the north poles and S the south poles of the magnets. As here shown, when the pointer is to the left of the center C of the scale it is biased counterclockwise and, vice versa, when it is to the right of the center of the scale it is biased clockwise. (It will be understood that the crossover point at which the drift torque changes direction may be varied between limits within 180° from the scale extremities, the preferred arrangement being however to have the crossover point at the center of the scale as shown.) For stopping the pointer at a small angular distance beyond the scale extremities, there are provided stops 23 against which the tailpiece 14a of the pointer may impinge, these stops being for example turned-up lugs formed integrally with the cross member 21.

In order that the pointer will be concealed from view when it is in its biased positions above described, I provide a generally sector-shaped non-transparent mask 24 for covering the central portion of the dial and the region which lies between the scale extremities as shown in Figure 1. (While the tailpiece 14a extends beyond this mask this tailpiece is out of view because it lies below the dial 12.) This mask is preferably provided as an integral portion of a securing ring 25 that is provided for holding the bezel 19 in place (see Figure 6). This ring fits snugly the inside wall of the case 17, and has a lug 25a bent outwardly which is adapted to engage a groove 17a in the wall of the case for localizing the mask in the desired angular position relative to the dial. As the ring is pressed upwardly within the case against the bezel the lug acts by its engagement with the case to secure the ring and the mask both tightly in place against the bezel. While I here show the mask as being separate from the bezel it may, in the broader aspects of my invention, be formed integral therewith as, for example, by painting.

It will be understood that except for the magnets 2 and 20 and the shield 5 all components of the meter construction hereinabove described are to be of non-magnetic materials.

While my invention has particularly useful application to instruments having permanent magnet rotors, it will be understood that it is not necessarily limited thereto. Rather, it is submitted that the preferred embodiment herein shown and described is illustrative and not necessarily limitative of my invention, and is subject to changes and modifications without departure from the scope of my invention, which I endeavor to express according to the following claims.

I claim:

1. In an electrical measuring instrument of the type having a pivoted rotor free to drift when the instrument is not energized, said rotor including a pointer and a permanent magnet magnetized transversely to the pivot axis of the rotor, a scale associated with said pointer, and electromagnetic means differently energizable for actuating said rotor to move said pointer to different positions in relation to said scale: the combination of a stationary permanent magnet having a magnetic field transverse to said pivot axis and superimposed on the field of said rotor magnet to bias said pointer to an off-scale position, said biasing magnet being positioned in relation to said rotor magnet when said pointer is at an intermediate point of said scale to cause over-center biasing of said pointer at said intermediate point whereby the pointer is urged towards one scale extremity when the pointer is within an adjacent portion of the scale and is urged in a reverse direction towards the other scale extremity when the pointer is in the remaining scale portion; and a mask covering portions beyond both extremities of said scale for concealing said pointer from view when the pointer is beyond either scale extremity.

2. In an electrical measuring instrument of the type having a pivoted rotor free to drift when the instrument is not energized and movable through an arcuate scale range greater than 180° and less than 360°, said rotor comprising a pointer and a permanent magnet magnetized transversely to its pivot axis, an arcuate scale associated with said pointer, and electromagnetic means having a magnetic field superimposed on that of said magnet and differently energizable to move said pointer to different positions on said scale: the combination of a stationary permanent magnet having a magnetic field transverse to said pivot axis and superimposed on that of said rotor magnet, said field being positioned in relation to that of said rotor magnet when said pointer is at an intermediate position of said scale to bias said pointer over-center at said intermediate position and cause the pointer to move to one scale extremity or the other, depending on the positioning of the pointer relative to the scale when said electromagnetic means is deenergized; and a sector-shaped mask covering the arcuate portion between the extremities of said scale for concealing said pointer from view whenever the instrument is deenergized.

JACOB L. ZAR.

REFERENCES CITED

The following references are of record in the file of this patent:

UNITED STATES PATENTS

| Number | Name | Date |
|---|---|---|
| 2,002,445 | Arey et al. | May 21, 1935 |
| 2,342,947 | Lingel | Feb. 29, 1944 |
| 2,354,618 | Sias | July 25, 1944 |
| 2,362,562 | Kelley | Nov. 14, 1944 |
| 2,372,002 | Kelly | Mar. 20, 1945 |